(12) United States Patent
Seo et al.

(10) Patent No.: US 8,547,927 B2
(45) Date of Patent: Oct. 1, 2013

(54) METHOD FOR USER EQUIPMENT TO PERFORM RANDOM ACCESS TO BASE STATION IN WIRELESS COMMUNICATION SYSTEM THAT SUPPORTS MULTIPLE UPLINK AND DOWNLINK CARRIERS

(75) Inventors: Dong Youn Seo, Anyang-si (KR); Jung Hoon Lee, Anyang-si (KR); Ki Jun Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 284 days.

(21) Appl. No.: 12/995,109

(22) PCT Filed: Nov. 3, 2009

(86) PCT No.: PCT/KR2009/006428
§ 371 (c)(1),
(2), (4) Date: Nov. 29, 2010

(87) PCT Pub. No.: WO2010/062060
PCT Pub. Date: Jun. 3, 2010

(65) Prior Publication Data
US 2011/0075629 A1    Mar. 31, 2011

Related U.S. Application Data

(60) Provisional application No. 61/110,959, filed on Nov. 3, 2008.

(30) Foreign Application Priority Data

Oct. 26, 2009  (KR) .................. 10-2009-0101708

(51) Int. Cl.
*H04W 72/04*   (2009.01)
*H04W 72/08*   (2009.01)
*H04B 7/208*   (2006.01)
*H04J 4/00*    (2006.01)

(52) U.S. Cl.
USPC ........... 370/330; 370/344; 370/436; 370/480; 370/281; 455/450

(58) Field of Classification Search
USPC ................. 370/328, 329, 330, 335, 336, 479, 370/480, 342–343, 252, 441
See application file for complete search history.

(56) References Cited

U.S. PATENT DOCUMENTS 7,643,454 B2 *   1/2010   Guethaus et al. ............. 370/335
7,983,215 B2 *   7/2011   Choi et al. .................... 370/329
(Continued)

FOREIGN PATENT DOCUMENTS

KR   10-2007-0107619 A   11/2007
KR   100788901 B1        12/2007

*Primary Examiner* — Candal Elpenord
(74) *Attorney, Agent, or Firm* — McKenna Long & Aldridge LLP

(57) ABSTRACT

A method for a user equipment to perform random access to a base station in a wireless communication system that supports multiple uplink and downlink carriers is provided. In the method, system information including cell identifier information of each of the downlink component carriers and PRACH TF slot and preamble sequence information which is common to all downlink component carriers, the system information being broadcast through each downlink component carrier corresponding to the cell identifier information, is received. A PRACH preamble is transmitted through one uplink component carrier linked to the downlink component carriers using the received PRACH TF slot and preamble sequence information. An RACH response is received through each of the downlink component carriers. The cell identifier information is used to transmit a Radio Resource Control (RRC) connection request signal and cell identifier information of a downlink component carrier, which the user equipment desires to access among the downlink component carriers.

8 Claims, 11 Drawing Sheets

(56) References Cited

U.S. PATENT DOCUMENTS

| | | | |
|---|---|---|---|
| 7,990,927 B2* | 8/2011 | Choi et al. | 370/335 |
| 8,014,359 B2* | 9/2011 | Cave et al. | 370/332 |
| 8,259,659 B2* | 9/2012 | Luft et al. | 370/329 |
| 2002/0075839 A1* | 6/2002 | Dick et al. | 370/342 |
| 2004/0071194 A1 | 4/2004 | Suwa et al. | |
| 2005/0266846 A1* | 12/2005 | Kim | 455/436 |
| 2007/0064656 A1* | 3/2007 | Lv et al. | 370/335 |
| 2008/0043771 A1* | 2/2008 | Cho et al. | 370/431 |
| 2008/0139214 A1* | 6/2008 | Sun et al. | 455/450 |
| 2009/0041240 A1* | 2/2009 | Parkvall et al. | 380/247 |
| 2009/0088175 A1* | 4/2009 | Pelletier et al. | 455/450 |
| 2009/0168750 A1* | 7/2009 | Pelletier et al. | 370/350 |
| 2010/0067470 A1* | 3/2010 | Damnjanovic et al. | 370/329 |

* cited by examiner

METHOD FOR USER EQUIPMENT TO PERFORM RANDOM ACCESS TO BASE STATION IN WIRELESS COMMUNICATION SYSTEM THAT SUPPORTS MULTIPLE UPLINK AND DOWNLINK CARRIERS

This application is a 35 U.S.C. §371 National Stage entry of International Application No. PCT/KR2009/006428, filed on Nov. 3, 2009, and claims priority to U.S. Provisional Application No. 61/110,959, filed on Nov. 3, 2008 and Korean Application No. 10-2009-0101708, filed on Oct. 26, 2009 each of which is hereby incorporated by reference in its entirety as if fully set forth herein.

TECHNICAL FIELD

The present invention relates to a method for a user equipment to perform random access to a base station in a wireless communication system that supports multiple uplink and downlink carriers.

BACKGROUND ART (1) Physical Channels of LTE System and Method for Transmitting Signals Using the Same FIG. 1 illustrates physical channels used in a 3rd Generation Project Partnership (3GPP) Long Term Evolution (LTE) system (Evolved Universal Terrestrial Radio Access (E-UTRA) Rel. 8 system), which is an example of a mobile communication system, and illustrates a general method for transmitting signals using the same.

When a User Equipment (UE) is powered on or has entered a new cell, the UE performs an initial cell search process, such as a process for achieving synchronization with a base station, at step S101. The UE may receive a Primary Synchronization CHannel (P-SCH) and a Secondary Synchronization CHannel (S-SCH) from the base station to achieve synchronization with the base station and to obtain information such as a cell IDentifier (ID). Thereafter, the user equipment may receive a Physical Broadcast CHannel (PBCH) from the base station to obtain intra-cell broadcasting information. On the other hand, at the initial cell search step, the UE may receive a downlink Reference Signal (RS) to check a downlink channel status.

A UE, which has completed the initial cell search, may receive a Physical Downlink Control CHannel (PDCCH) and a Physical Downlink Shared CHannel (PDSCH) corresponding to information of the PDCCH to obtain more detailed System Information (SI) at step S102.

On the other hand, a UE, which has not completed the initial cell search, may then perform a random access procedure to complete access to the base station at steps S103 to S106. To accomplish this, the UE may transmit a specific sequence as a preamble through a Physical Random Access CHannel (PRACH) (S103) and may receive a response message in response to the random access through a PDCCH and a PDSCH corresponding to the PDCCH (S104). In the case of contention-based random access, excluding the case of handover, the UE may perform a contention resolution procedure such as a procedure for transmitting an additional PRACH (S105) and receiving a PDCCH and a PDSCH corresponding to the PDCCH (S106).

When the UE has performed the above procedure, the UE may perform, as a general uplink/downlink signal transmission procedure, a procedure for receiving a PDCCH/PDSCH (S107) and transmitting a Physical Uplink Shared CHannel (PUSCH)/Physical Uplink Control CHannel (PUCCH) (S108).

(2) Random Access Scheme in LTE System

A base station manages system resources in a cellular wireless communication system. However, since it is not possible to allocate dedicated resources to a UE until the UE starts communication with the base station to be connected to the base station, the UE accesses the base station in a random access scheme in which the same wireless frequency resources are shared by a plurality of UEs in an initial access procedure. Since UEs share resources, UEs need to avoid collision of resources that they use and to discriminate cells that they desire to access. Thus, UEs use methods of discriminating resources using time, frequency, preamble, or the like.

FIG. 2 illustrates an initial random access scheme of a 3GPP LTE system.

At a 0th step (S200), a base station (eNB) broadcasts System Information (SI). Specifically, the base station broadcasts PRACH configuration information of each cell, such as available time-frequency resources and available Random Access CHannel (RACH) preamble set information, through the system information.

At a 1st step (S210), a UE transmits a PRACH preamble. Specifically, the UE receives the system information broadcast from each cell that the UE desires to access and selects and transmits an available RACH preamble in the time-frequency resources according to the system information. Here, a message in which the RACH preamble is transmitted is referred to as a "Message 1".

At a 2nd step (S220), the base station sends a PRACH response. Specifically, the base station identifies a cell that the UE desires to access through the preamble and time-frequency resources, through which the preamble has been transmitted, and transmits an RACH response through a PDCCH addressed (or indicated) by a Random Access-Radio Network Temporary Identifier (RA-RNTI) corresponding to the time-frequency resources through which the preamble has been transmitted. Timing alignment information, initial uplink grant, temporary ID (specifically, temporary C-RNTI) allocation information, and the like are transmitted through the RACH response. The UE detects whether or not a PDCCH addressed by the RA-RNTI has been received during a specific time-interval window after the preamble is transmitted. Here, a message in which the RACH response message is transmitted is referred to as a "Message 2".

At a 3rd step (S230), the UE performs scheduled transmission. Specifically, if preamble information transmitted by the UE is included in the RACH response received by the UE, the UE transmits a Radio Resource Control (RRC) connection request and at least a Non-Access Stratum (NAS) UE ID through a PUSCH that has been allocated to the UE through the initial uplink grant. A message in which the connection request and at least the NAS user ID are transmitted is referred to as a "Message 3".

At a 4th step (S240), the base station transmits a contention resolution message. Specifically, the base station transmits the contention resolution message to the UE. When there is no contention, the Temporary Cell Radio Network Temporary Identity (TC-RNTI) is a Cell Radio Network Temporary Identity (C-RNTI). Thereafter, the UE detects and receives a PDCCH addressed by the C-RNTI. A message in which the contention resolution message is transmitted is referred to as a "Message 4".

(3) Method of Signaling Carrier Frequency Band in LTE System

A 3GPP system has been designed so as to operate in frequency bands as shown in the following Table 1. Table 1 illustrates uplink and downlink frequency bands in E-UTRA.

TABLE 1

| E-UTRA Band | Uplink (UL) BS receive UE transmit $F_{UL\_low}$-$F_{UL\_high}$ | Downlink (DL) BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

As illustrated in Table 1, two different frequency bands are used, respectively, in uplink and downlink in the case of Frequency Division Duplex (FDD) and one frequency band is divided in time into two sections to be used, respectively, in uplink and downlink in the case of Time Division Duplex (TDD). One frequency band (in the case of TDD) and one pair of frequency bands (in the case of FDD) are used for one cell and one base station may have a number of cells which are discriminated spatially or through different frequency bands. In the above Table 1, a channel raster is 100 KHz, which is a central frequency that the UE needs to search for when achieving synchronization with the base station at an initial stage. This indicates that the central frequency of each carrier frequency should be a multiple of 100 KHz.

The sizes of bands and carrier frequencies of uplink and downlink are defined in an E-UTRA Absolute Radio Frequency Channel Number (EARFCN) format and are transmitted through system information. In the case of FDD, different uplink and downlink bands are used in pairs and an EARFCN of the uplink band is transmitted to the UE. In the case where a number of neighboring cells which are discriminated through frequency bands are present, EARFCN information of the bands of the cells is broadcast through system information to enable handover to the cells.

The following Table 2 illustrates channel numbers of frequency bands.

TABLE 2

| E-UTRA Band | Downlink | | | Uplink | | |
|---|---|---|---|---|---|---|
| | $F_{DL\_low}$ [MHz] | $N_{offs-DL}$ | Range of $N_{DL}$ | $F_{UL\_low}$ [MHz] | $N_{offs-UL}$ | Range of $N_{UL}$ |
| 1 | 2110 | 0 | 0-599 | 1920 | 13000 | 13000-13599 |
| 2 | 1930 | 600 | 600-1199 | 1850 | 13600 | 13600-14199 |
| 3 | 1805 | 1200 | 1200-1949 | 1710 | 14200 | 14200-14949 |
| 4 | 2110 | 1950 | 1950-2399 | 1710 | 14950 | 14950-15399 |
| 5 | 869 | 2400 | 2400-2649 | 824 | 15400 | 15400-15649 |
| 6 | 875 | 2650 | 2650-2749 | 830 | 15650 | 15650-15749 |
| 7 | 2620 | 2750 | 2750-3449 | 2500 | 15750 | 15750-16449 |
| 8 | 925 | 3450 | 3450-3799 | 880 | 16450 | 16450-16799 |
| 9 | 1844.9 | 3800 | 3800-4149 | 1749.9 | 16800 | 16800-17149 |
| 10 | 2110 | 4150 | 4150-4749 | 1710 | 17150 | 17150-17749 |
| 11 | 1475.9 | 4750 | 4750-4999 | 1427.9 | 17750 | 17750-17999 |
| 12 | 728 | 5000 | 5000-5179 | 698 | 18000 | 18000-18179 |
| 13 | 746 | 5180 | 5180-5279 | 777 | 18180 | 18180-18279 |
| 14 | 758 | 5280 | 5280-5379 | 788 | 18280 | 18280-18379 |
| ... | | | | | | |
| 33 | 1900 | 26000 | 26000-26199 | 1900 | 26000 | 26000-26199 |
| 34 | 2010 | 26200 | 26200-26349 | 2010 | 26200 | 26200-26349 |
| 35 | 1850 | 26350 | 26350-26949 | 1850 | 26350 | 26350-26949 |
| 36 | 1930 | 26950 | 26950-27549 | 1930 | 26950 | 26950-27549 |
| 37 | 1910 | 27550 | 27550-27749 | 1910 | 27550 | 27550-27749 |
| 38 | 2570 | 27750 | 27750-28249 | 2570 | 27750 | 27750-28249 |
| 39 | 1880 | 28250 | 28250-28649 | 1880 | 28250 | 28250-28649 |
| 40 | 2300 | 28650 | 28650-29649 | 2300 | 28650 | 28650-29649 |

In Table 2, carrier frequencies (MHz) and an EARFCN for downlink satisfy the following Mathematical Expression 1.

$$F_{DL}=F_{DL\_low}+1(N_{DL}-N_{Offs-DL})  \quad \text{[MATHEMATICAL EXPRESSION 1]}$$

In Mathematical Expression 1, $F_{DL}$ denotes an upper frequency limit of the corresponding frequency band, $F_{DL\_low}$ denotes a lower frequency limit of the band, $N_{Offs-DL}$ denotes an offset value, and $N_{DL}$ of the band denotes a downlink EARFCN.

In Table 2, carrier frequencies (MHz) and EARFCNs for uplink satisfy the following Mathematical Expression 2.

$$F_{UL}=F_{UL\_low}+0.1(N_{UL}-N_{Offs-UL}) \quad \text{[MATHEMATICAL EXPRESSION 2]}$$

In Mathematical Expression 2, $F_{UL}$ denotes an upper frequency limit of the corresponding frequency band, $F_{UL\_low}$ denotes a lower frequency limit of the band, $N_{Offs-UL}$ denotes an offset value, and $N_{UL}$ of the band denotes an uplink EARFCN.

FIG. 3 illustrates a single component carrier of an LTE system. As shown in FIG. 3, in the case of the LTE system, transmission and reception are performed through one frequency band, and transmission and reception are performed through frequency band handover using an inter-frequency handover procedure when transmission and reception are performed through an adjacent frequency band.

FIG. 4 illustrates multiple carriers of an LTE-Advanced (LTE-A) system which is an improved version of the LTE system. In the case of the LTE-A system, one UE can simultaneously transmit and receive a plurality of Component Carriers (CC).

In the conventional LTE system, transmission and reception are performed through a single frequency band and, in the case where transmission and reception are performed through an adjacent frequency band, transmission and reception are performed using frequency band handover through an inter-frequency handover procedures.

However, the system may operate abnormally if the random access procedures of the LTE system described above is directly applied when transmission and reception are performed through a plurality of frequency bands.

DISCLOSURE

Technical Problem

An object of the present invention devised to solve the problem lies on providing a method for a user equipment to perform random access to a base station in a wireless communication system that supports multiple uplink and downlink carriers, the method enabling a random access procedure to be smoothly performed.

Objects of the present invention are not limited to the above object and other objects will be clearly understood by those skilled in the art from the following description.

Technical Solution

The objects of the present invention can be achieved by providing a method for a user equipment to perform random access to a base station in a wireless communication system that supports multiple uplink and downlink carriers, the method including receiving system information including cell identifier information of each of a plurality of downlink component carriers and Physical Random Access Channel (PRACH) Time Frequency (TF) slot and preamble sequence information which is common to all of the plurality of downlink component carriers, the system information being broadcast through each of the plurality of downlink component carriers corresponding to the cell identifier information, transmitting a PRACH preamble through one uplink component carrier linked to the plurality of downlink component carriers using the received PRACH TF slot and preamble sequence information, receiving a Random Access Channel (RACH) response through each of the plurality of downlink component carriers, and transmitting, using the cell identifier information, cell identifier information of a downlink component carrier, which the user equipment desires to access among the plurality of downlink component carriers, and a Radio Resource Control (RRC) connection request signal.

The cell identifier information may include physical cell identifier information that identifies a cell according to characteristics of a physical layer.

The objects of the present invention can also be achieved by providing a method for a user equipment to perform random access to a base station in a wireless communication system that supports multiple uplink and downlink carriers, the method including receiving system information including overall index information of a plurality of downlink component carriers, the overall index information identifying the plurality of downlink component carriers, and Physical Random Access Channel (PRACH) Time Frequency (TF) slot and preamble sequence information which is common to all of the plurality of downlink component carriers, the system information being broadcast through each of the plurality of downlink component carriers, transmitting a PRACH preamble through one uplink component carrier linked to the plurality of downlink component carriers using the received PRACH TF slot and preamble sequence information, receiving a Random Access Channel (RACH) response through each of the plurality of downlink component carriers, and transmitting, using the index information, index information of a downlink component carrier, which the user equipment desires to access among the plurality of downlink component carriers, and a Radio Resource Control (RRC) connection request signal.

Respective indices of the plurality of downlink component carriers may be defined in increasing or decreasing order of corresponding frequencies.

The objects of the present invention can be achieved by providing a method for a user equipment to perform random access to a base station in a wireless communication system that supports multiple uplink and downlink carriers, the method including receiving system information including index information of each of a plurality of downlink component carriers and Physical Random Access Channel (PRACH) Time Frequency (TF) slot and preamble sequence information which is common to all of the plurality of downlink component carriers, the system information being broadcast through each of the plurality of downlink component carriers corresponding to the index information, transmitting a PRACH preamble through one uplink component carrier linked to the plurality of downlink component carriers using the received PRACH TF slot and preamble sequence information, receiving a Random Access Channel (RACH) response through each of the plurality of downlink component carriers, and transmitting, using the index information, index information of a downlink component carrier, which the user equipment desires to access among the plurality of downlink component carriers, and a Radio Resource Control (RRC) connection request signal.

Respective indices of the plurality of downlink component carriers may be defined in increasing or decreasing order of corresponding frequencies.

The objects of the present invention can be achieved by providing a method for a user equipment to perform random access to a base station in a wireless communication system that supports multiple uplink and downlink carriers, the method including receiving system information including Physical Random Access Channel (PRACH) Time Frequency (TF) slot and preamble sequence information which is common to all of a plurality of downlink component carriers, the system information being broadcast through each of the plurality of downlink component carriers, transmitting a PRACH preamble through one uplink component carrier linked to the plurality of downlink component carriers using the received PRACH TF slot and preamble sequence information, receiving a Random Access Channel (RACH) response and index information of each of the plurality of downlink component carriers through each of the plurality of downlink component carriers corresponding to the index information, and transmitting, using the index information, index information of a downlink component carrier, which the user equipment desires to access among the plurality of downlink component carriers, and a Radio Resource Control (RRC) connection request signal.

Respective indices of the plurality of downlink component carriers may be defined in increasing or decreasing order of corresponding frequencies.

The objects of the present invention can be achieved by providing a method for a user equipment to perform random access to a base station in a wireless communication system that supports multiple uplink and downlink carriers, the method including receiving system information including Physical Random Access Channel (PRACH) Time Frequency (TF) slot and preamble sequence information which is common to all of a plurality of downlink component carriers, the system information being broadcast through each of the plurality of downlink component carriers, transmitting a PRACH preamble through one uplink component carrier linked to the plurality of downlink component carriers using the received PRACH TF slot and preamble sequence information, receiving a Random Access Channel (RACH) response of each of the plurality of downlink component carriers at predetermined time intervals through each of the plurality of downlink component carriers, and transmitting, by the user equipment, a Radio Resource Control (RRC) connection request signal when a predetermined time elapses after the user equipment receives the RACH response so that the base station identifies a downlink component carrier that the user equipment desires to access among the plurality of downlink component carriers with reference to a time at which the RRC connection request signal is received.

A time at which the RRC connection request signal is transmitted may be after the RACH response is received and before a next RACH response is received.

Advantageous Effects

According to the present invention, it is possible to smoothly perform a random access procedure in which a user equipment randomly accesses a base station in a wireless communication system that supports multiple uplink and downlink carriers.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

Figure 1:
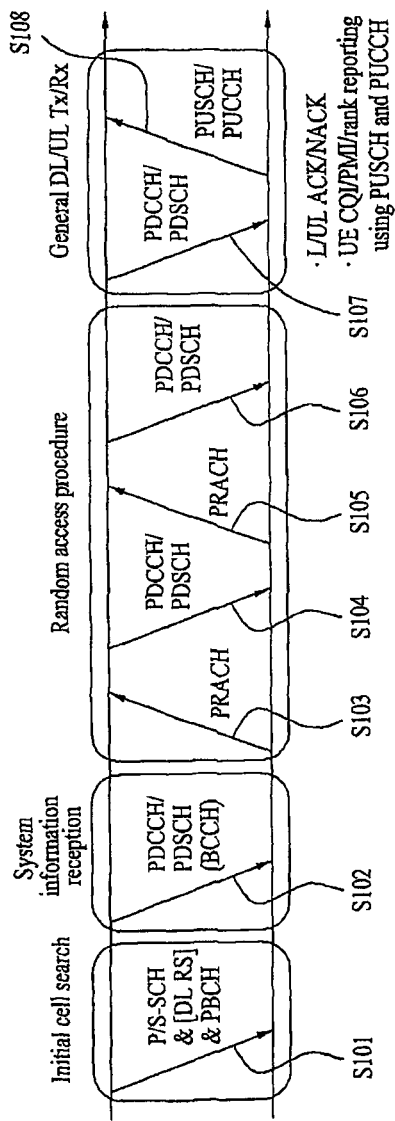
FIG. 1 illustrates physical channels used in a 3GPP LTE system, which is an example of a mobile communication system, and illustrates a general method for transmitting signals using the same.
Figure 2:
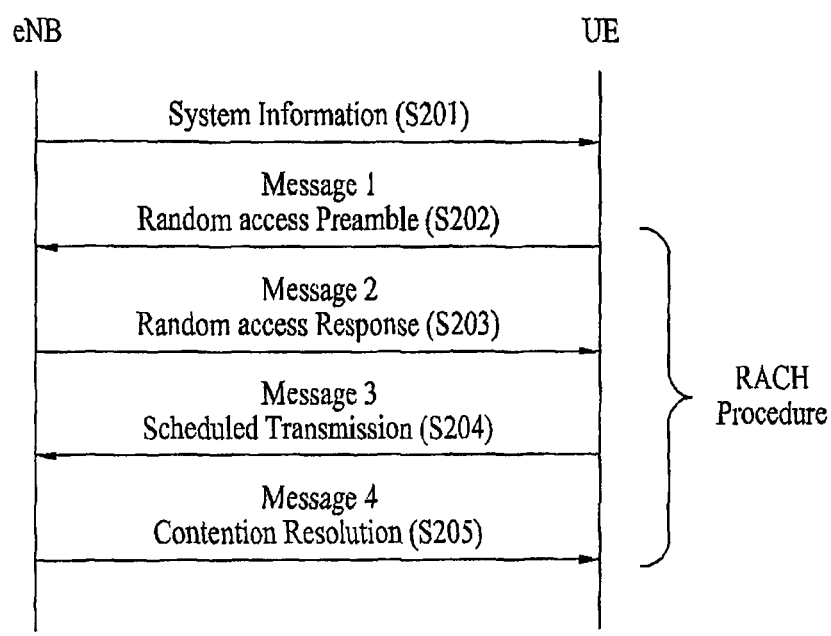
FIG. 2 illustrates an initial random access scheme of a 3GPP LTE system.
Figure 3:
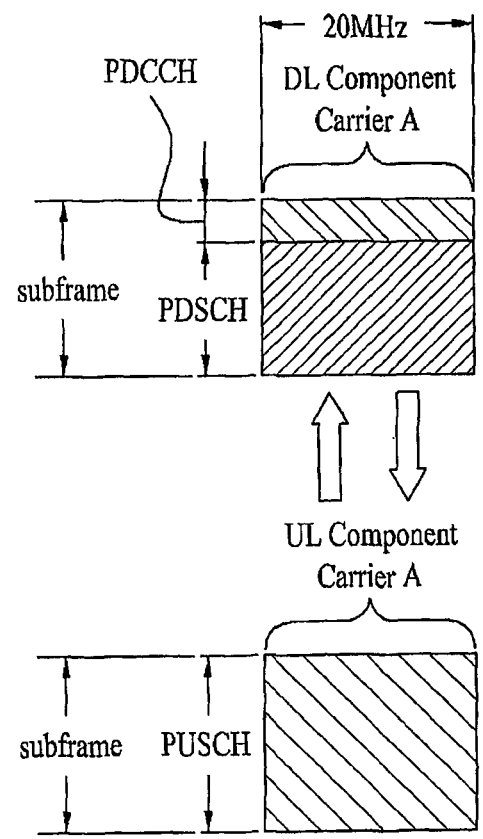
FIG. 3 illustrates a single component carrier of an LTE system.
Figure 4:
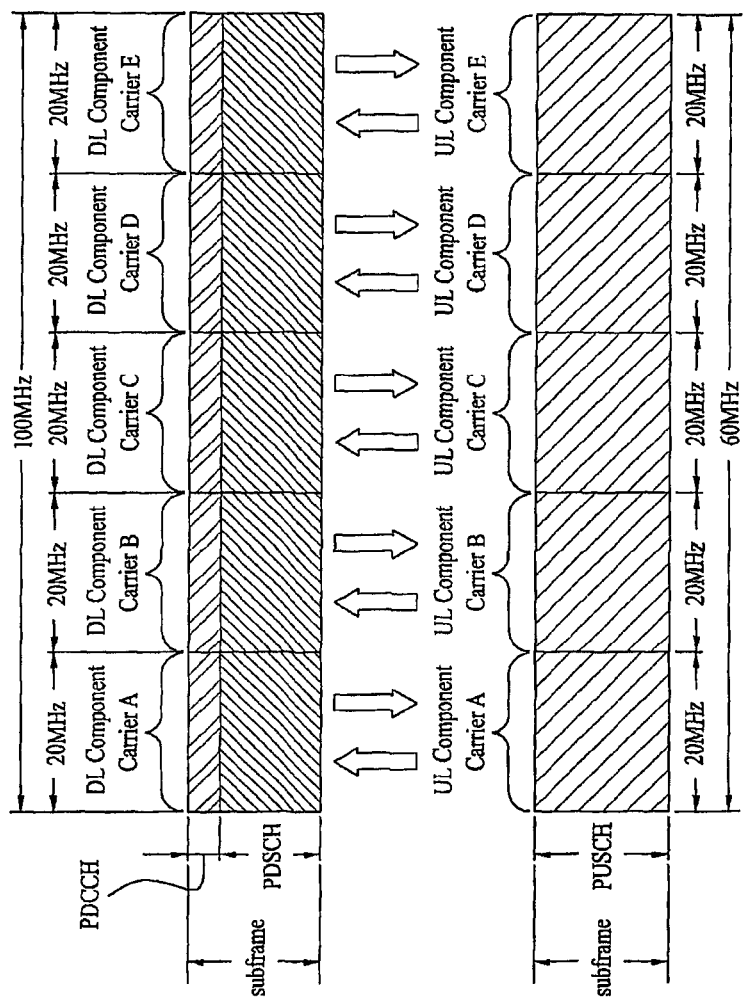
FIG. 4 illustrates multiple carriers of an LTE-A system which is an improved version of the LTE system.
Figure 5:
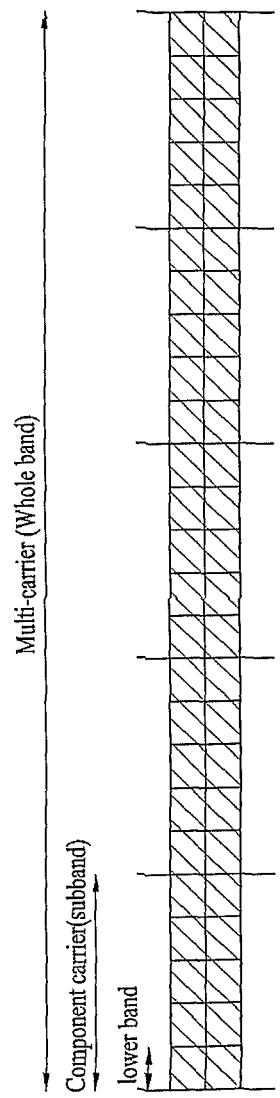
FIG. 5 illustrates the concept of multi-carrier.

First, a description is given of the concepts of the term "multi-carrier" and the term "component carrier". FIG. 5 illustrates the concept of multi-carrier. As shown in FIG. 5, multi-carrier indicates a total frequency band that is used by the base station and has the same meaning as "whole band".

The component carrier is one of the component carriers that constitute the multi-carrier. That is, a plurality of component carriers constitutes a multi-carrier through carrier aggregation. Each component carrier includes a plurality of lower bands. Here, when the term "multi-carrier" is replaced with "whole band", the aggregation of component carriers may be referred to as "bandwidth aggregation". The term "lower band", which indicates a sub-band, may be replaced with "partial band". The carrier aggregation aggregates a plurality of carriers to extend the bandwidth in order to increase the data rate. For example, the conventional system uses 20 MHz as one carrier, whereas the system of the present invention aggregates five 20 Mhz carriers to extend the bandwidth up to 100 MHz. The carrier aggregation includes aggregation of carriers that are located in different frequency bands.

Figure 6:
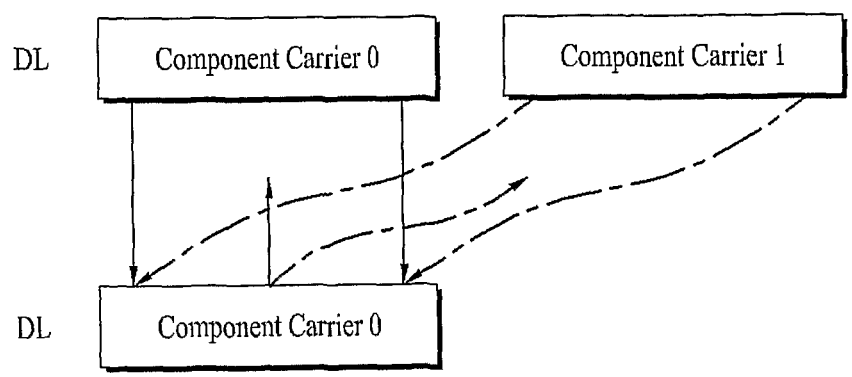
FIG. 6 illustrates links between downlink and uplink component carriers in an example in which the number of downlink component carriers is greater than the number of uplink component carriers.

FIG. 6 illustrates links between downlink and uplink component carriers in an example in which the number of downlink component carriers is greater than the number of uplink component carriers. Here, one uplink transmission band corresponding to one downlink transmission band of the conventional system is used. However, it is necessary to check if there is a problem when the random access procedure is performed in the case where a plurality of component carriers are simultaneously transmitted between one UE and one base station, especially when one uplink component carrier is linked to a plurality of downlink component carriers as shown in FIG. 6.

The following description will be described with reference to the case of FIG. 6 as an example. This embodiment is not limited to the case of FIG. 6 and is applicable to any case where the number of downlink component carriers is greater than the number of uplink component carriers.

First, a description will be given of a random access procedure applied when a different Time Frequency (TF) slot or preamble sequence is used for each downlink component carrier.

0th step (broadcasting step): The base station broadcasts an uplink EARFCN, a PRACH TF slot, and a preamble sequence linked to each downlink component carrier through System Information (SI).

1st step (message 1 transmission step): Since an uplink component carrier is shared by two downlink component carriers, the UE transmits a PRACH preamble according to the conditions of a TF slot and a preamble sequence received from a downlink component carrier that the UE desires to access through the same uplink component carrier. Although the uplink component carrier is shared, the base station can determine a downlink component carrier, according to SI of which the PRACH preamble has been transmitted, since the TF slots and the preamble sequences of the two downlink component carriers are different. At this step, a message in which the PRACH preamble is transmitted is referred to as a "Message 1".

2nd step (message 2 transmission step): The base station transmits an RACH response only through a downlink component carrier that matches the TF slot and preamble sequence, i.e., a downlink component carrier that the UE desires to access. The RACH response includes timing alignment information, an initial uplink grant signal, temporary ID (specifically, temporary C-RNTI) allocation information, and the like. The UE detects whether or not a PDCCH addressed by the RA-RNTI has been received during a specific time-interval window after the preamble is transmitted. At this step, a message in which the RACH response is transmitted is referred to as a "Message 2".

3rd step (message 3 transmission step): If preamble information that the UE has transmitted is included in the RACH response, the UE transmits an RRC connection request and at least a NAS UE ID through a PUSCH allocated through the initial uplink grant signal. At this step, a message in which the RRC connection request and at least the NAS UE ID are transmitted is referred to as a "Message 3".

4th step (message 4 transmission step): The base station transmits a contention resolution message to the UE. When there is no contention, the TC-RNTI is a C-RNTI and the UE detects and receives a PDCCH addressed by the C-RNTI at a later time. At this step, a message in which the contention resolution message is transmitted is referred to as a "Message 4".

As described above, no problem occurs in association with the random access procedure in the case where a different TF slot or preamble sequence is set for each downlink component carrier.

However, in the case where a plurality of downlink component carriers are present, the following problem may occur in association with a random access procedure applied when the same TF slot or preamble sequence is used for all downlink component carriers.

A description will now be given of a random access procedure applied when the same TF slot or preamble sequence is used for all downlink component carriers in the case where a plurality of downlink component carriers are present.

0th step (broadcasting step): The base station broadcasts an uplink EARFCN, a PRACH TF slot, and a preamble sequence linked to each downlink component carrier, which are common to all downlink component carriers, through system information.

1st step (message 1 transmission step): Since an uplink component carrier linked to downlink component carriers is shared (i.e., common), the UE transmits a PRACH preamble according to the conditions of a TF slot and a preamble sequence received from a downlink component carrier, which the UE desires to access, through the same uplink component carrier. Since the uplink component carrier is shared and the TF slots and the preamble sequences of the two downlink component carriers are different, the base station cannot determine which downlink component carrier corresponds to the SI that has been read for the PRACH preamble. At this step, a message in which the PRACH preamble is transmitted is referred to as a "Message 1".

2nd step (message 2 transmission step): Thus, the base station transmits an RACH response through all downlink component carriers linked to the uplink component carrier. The RACH response includes timing alignment information, an initial uplink grant signal, temporary ID allocation information, and the like. The UE detects whether or not a PDCCH addressed by the RA-RNTI has been received from the downlink component carrier, SI of which has been read, during a specific time-interval window after the preamble is transmitted. At this step, a message in which the RACH response is transmitted is referred to as a "Message 2".

3rd step (message 3 transmission step): If preamble information that the UE has transmitted is included in the RACH response, the UE transmits an RRC connection request and at least a NAS UE ID through a PUSCH allocated through the initial uplink grant. However, the base station has no way to determine, from only these pieces of information, which downlink component carrier the UE has accessed. Accordingly, there is a need to inform the base station of the downlink component carrier that the UE desires to access. At this step, a message in which the RRC connection request and at least the NAS UE ID are transmitted is referred to as a "Message 3".

4th step (message 4 transmission step): The base station transmits a contention resolution message to the UE. When there is no contention, the TC-RNTI is a C-RNTI and the UE detects and receives a PDCCH addressed by the C-RNTI at a later time. At this step, a message in which the contention resolution message is transmitted is referred to as a "Message 4".

Since the base station has no way to determine which downlink component carrier the UE has accessed at the third step as described above, there is a need to provide a method in which the UE informs the base station of a downlink component carrier that the UE desires to access. Thus, the present invention suggests methods in which the UE informs the base station of a downlink component carrier that the UE desires to access in the case where the same TF slot or preamble sequence is set for each downlink component carrier.

As the first method, the present invention suggests a method in which a cell ID is transmitted through the message 3. In each downlink component carrier, a Global Cell ID (GCI) and a Physical Cell ID (PCI) are broadcast through SI. The GCI is uniquely provided for each cell and the PCI is an ID for cell identification according to the characteristics of the physical layer. The PCI includes 504 IDs and is applied to uplink functions. Examples of the uplink functions to which the PCI is applied include Physical Uplink Shared CHannel (PUSCH) hopping, Physical Uplink Control CHannel (PUCCH) RS sequence generation, and RS group hopping.

Figure 7:
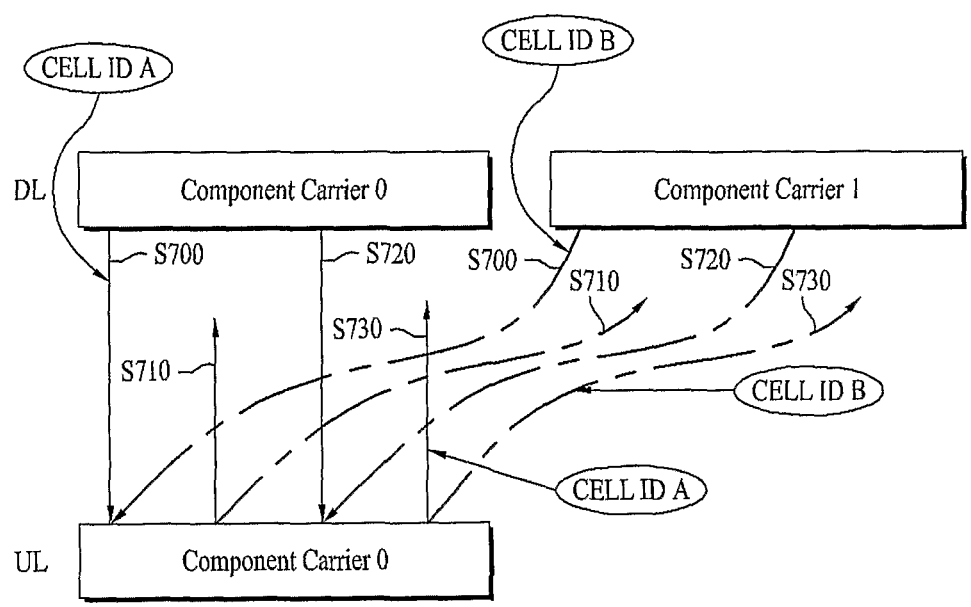
FIG. 7 illustrates the first method in which the UE informs the base station of a downlink component carrier that the UE desires to access in the case where the same TF slot or preamble sequence is set for each downlink component carrier according to an embodiment of the present invention.

FIG. 7 illustrates the first method in which the UE informs the base station of a downlink component carrier that the UE desires to access in the case where the same TF slot or preamble sequence is set for each downlink component carrier according to an embodiment of the present invention. Steps 700 to 730 in FIG. 7 correspond to the 0th to 3rd steps described above, respectively. At the 3rd step described above, when the UE transmits a message 3 to the base station, the message 3 may include a GCI or the message 3 may include a PCI in the case where the PCI is different for each downlink component carrier. Since a cell ID is included in the message 3 as described above, the base station can determine which downlink component carrier the UE desires to access.

Figure 8:
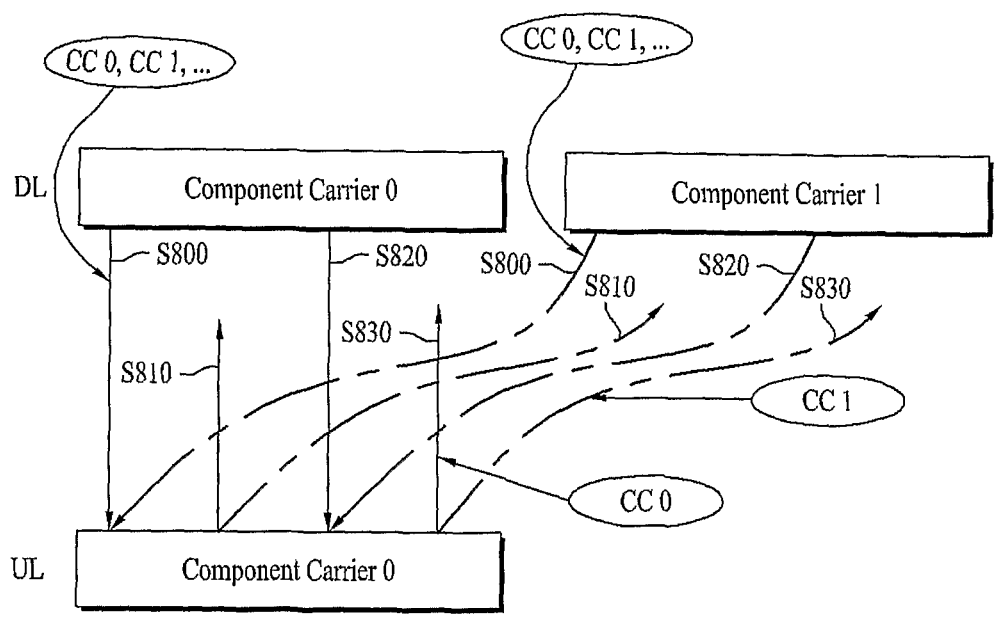
FIG. 8 illustrates the second method in which the UE informs the base station of a downlink component carrier that the UE desires to access in the case where the same TF slot or preamble sequence is set for each downlink component carrier according to an embodiment of the present invention.

As the second method, the present invention suggests a method in which the UE transmits a downlink component carrier index through a message 3 in the case where it is possible to determine an overall downlink component carrier structure through SI. FIG. 8 illustrates the second method in which the UE informs the base station of a downlink component carrier that the UE desires to access in the case where the same TF slot or preamble sequence is set for each downlink component carrier according to an embodiment of the present invention. Steps 800 to 830 in FIG. 8 correspond to the 0th to 3rd steps described above, respectively. In the first method, 9-bit information is needed to transmit the cell ID in the message 3 since 504 IDs are present for the PCI. If each component carrier is 20 MHz in a system that supports 100 MHz, it is possible to discriminate 5 component carriers using 3-bit information since 5 component carriers are aggregated. Accordingly, it is possible to assign an index to a downlink component carrier that the user desires to access and to transmit a message 3 including the index in the case where it is possible to determine an overall downlink component carrier structure through SI as shown in FIG. 8. The index can be defined in increasing or decreasing order of the frequency of the downlink component carrier. Through this method, the UE can determine which downlink component carrier the UE desires to access.

Figure 9:
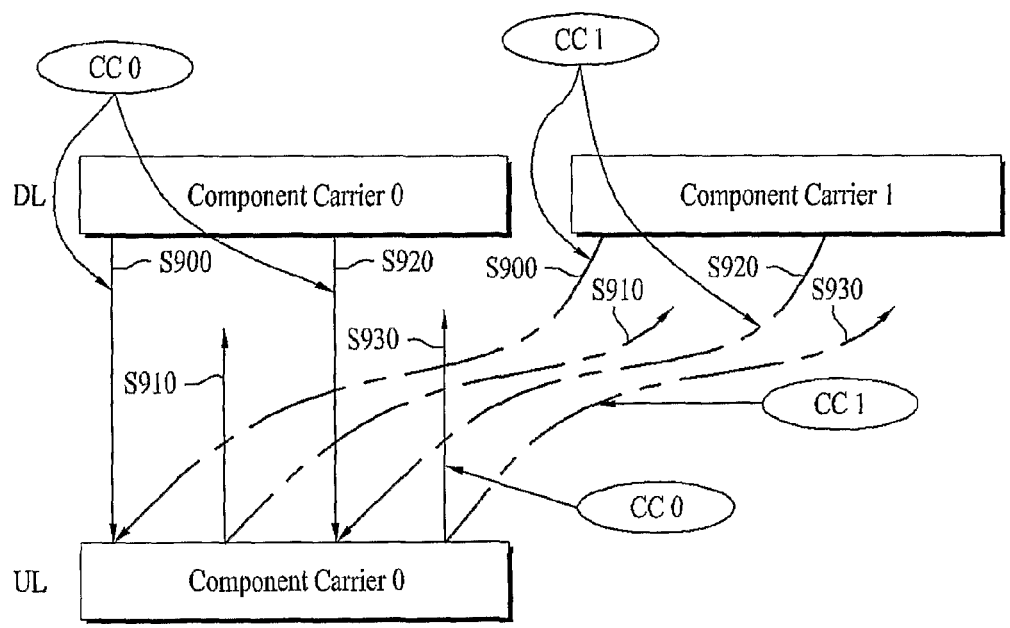
FIG. 9 illustrates the third method in which the UE informs the base station of a downlink component carrier that the UE desires to access in the case where the same TF slot or preamble sequence is set for each downlink component carrier according to an embodiment of the present invention.

As the third method, the present invention suggests a method in which the UE transmits an index of a downlink component carrier that the UE desires to access through a message 3 in the case where the UE can determine the downlink component carrier index through SI or a message 2. FIG. 9 illustrates the third method in which the UE informs the base station of a downlink component carrier that the UE desires to access in the case where the same TF slot or preamble sequence is set for each downlink component carrier according to an embodiment of the present invention. Steps 900 to 930 in FIG. 9 correspond to the 0th to 3rd steps described above, respectively. The first method in which the cell ID is transmitted in the message 3 causes overhead since 9-bit information is needed and also requires unnecessary broadcasting since an overall downlink component carrier structure is broadcast through SI in every downlink component carrier.

The present invention may use the following method to overcome these problems. It is possible to transmit an index of a downlink component carrier that the UE desires to access through inclusion in the message 3 if the index of the downlink component carrier that the UE desires to access is transmitted through inclusion in SI of each downlink component carrier or if the index of the downlink component carrier is transmitted through inclusion in the message 2 as shown in FIG. 9. Using this method, the base station can determine which downlink component carrier the UE desires to access.

Methods for transmitting the index of the downlink component carrier in the message 2 or the message 3 may include a method using masking in a CRC or a method of applying a scrambling sequence according to the ID.

Figure 10:
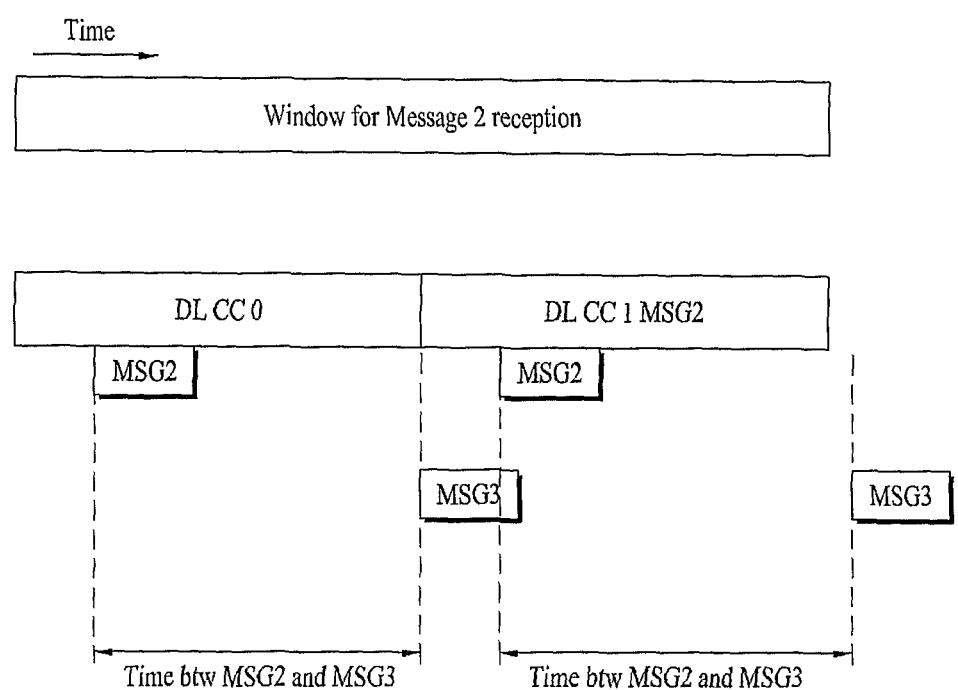
FIG. 10 illustrates the fourth method in which the UE informs the base station of a downlink component carrier that the UE desires to access in the case where the same TF slot or preamble sequence is set for each downlink component carrier according to an embodiment of the present invention.

As the fourth method, the present invention suggests a method in which a downlink component carrier is identified (or discriminated) using a transmission time interval of the message 2. FIG. 10 illustrates the fourth method in which the UE informs the base station of a downlink component carrier that the UE desires to access in the case where the same TF slot or preamble sequence is set for each downlink component carrier according to an embodiment of the present invention. The UE waits for a message 2 within a window having a predetermined time interval after the UE transmits a PRACH preamble (message 1). Upon receiving the message 2, the UE transmits a message 3 at a predetermined time interval from the reception of the message 2. In this method, the fact that the same TF slot is set for each downlink component carrier indicates that the same TF slot is broadcast through SI for each downlink component carrier in order to achieve compatibility. Accordingly, in this method, it is possible to identify a downlink component carrier through a transmission time interval of the message 2 based on a predefined agreement between the base station and the UE.

Accordingly, if the base station individually transmits the message 2 for each downlink component carrier in a separate window as shown in FIG. 10, the base station can determine which downlink component carrier the UE desires to access with reference to the time at which the message 3 is received. That is, when the base station receives a message 3 within a predetermined time interval after the base station transmits a message 2, the base station can determine that the message 3 corresponds to a downlink component carrier in which the message 2 is transmitted.

Since the base station receives a message 3 from the UE within a predetermined time interval after the base station transmits a message 2 to the UE through a downlink component carrier 0 (DL CC0) as shown in FIG. 10, the base station identifies the received message 3 as a message 3 corresponding to the downlink component carrier 0.

According to the method described above, in the case where the number of downlink component carriers is greater than the number of uplink component carriers, it is possible to determine which downlink component carrier the UE has accessed even though the same TF slot or preamble sequence is set for each downlink component carrier. Accordingly, it is possible to smoothly perform the initial random access procedure when the number of downlink component carriers is greater than the number of uplink component carriers.

Figure 11:
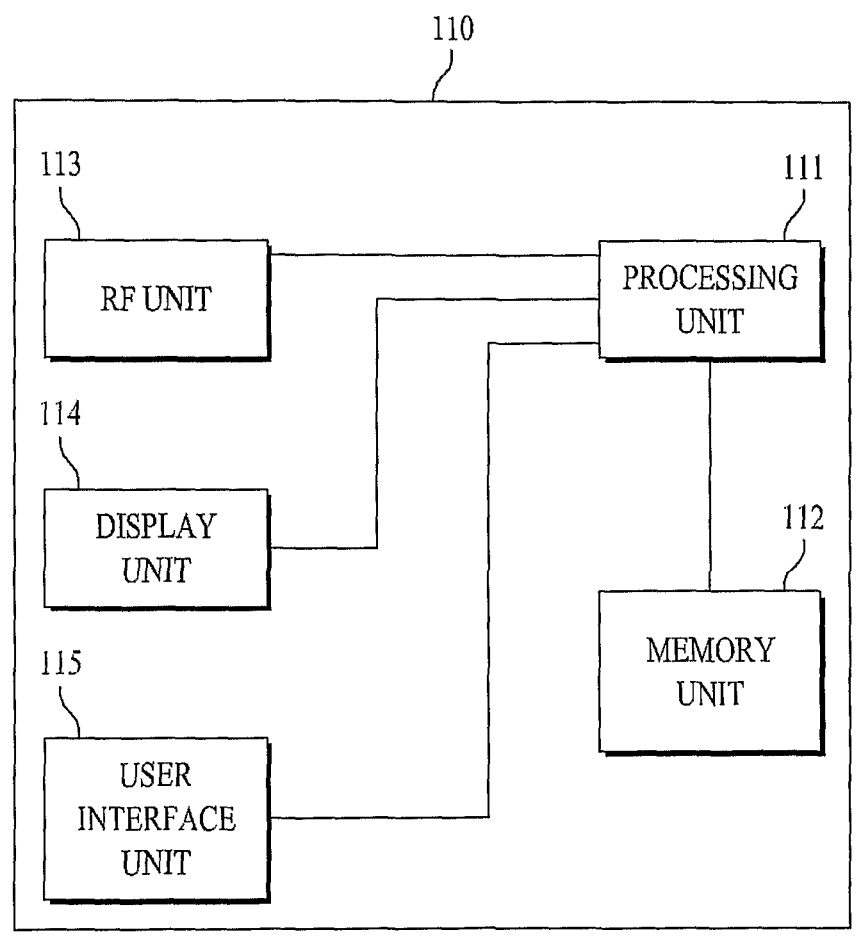
FIG. 11 is a block diagram illustrating a configuration of a device which can be applied to a UE or a base station and which can implement the present invention.

FIG. 11 is a block diagram illustrating a configuration of a device which can be applied to a UE or a base station and which can implement the present invention. As shown in FIG. 11, the device 110 includes a processing unit 111, a memory unit 112, a Radio Frequency (RF) unit 113, a display unit 114, and a user interface unit 115. The functions of a physical interface protocol layer are performed at the processing unit 111. The processing unit 111 provides a control plane and a user plane. The functions of each layer may be performed at the processing unit 111. The memory unit 112 is electrically connected to the processing unit 111 and stores an operating system, applications, and general files. If the device 110 is a UE, the display unit 114 can display a variety of information and may be implemented using a known Liquid Crystal Display (LCD), Organic Light Emitting Diode (OLED), or the like. The user interface unit 115 can be constructed in combination with a known user interface such as a keypad or a touch screen. The RF unit 113 is electrically connected to the processing unit 111 and transmits or receives a wireless signal.

MODE FOR INVENTION

Various embodiments have been described in the best mode for carrying out the invention.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be used for a user equipment, a base station, or other devices in a wireless mobile communication system.

The invention claimed is:

1. A method for a user equipment to perform random access to a base station in a wireless communication system that supports multiple uplink and downlink component carriers, the method comprising:

receiving system information including overall index information of a plurality of the downlink component carriers, the overall index information identifying the plurality of the downlink component carriers, and Physical Random Access Channel (PRACH) Time Frequency (TF) slot and preamble sequence information which is common to all of the plurality of the downlink component carriers, the system information being broadcast through each of the plurality of the downlink component carriers;

transmitting a PRACH preamble through one uplink component carrier linked to the plurality of the downlink component carriers using the received PRACH TF slot and preamble sequence information;

receiving a Random Access Channel (RACH) response through each of the plurality of the downlink component carriers; and transmitting, using the overall index information, index information of a downlink component carrier, which the user equipment desires to access among the plurality of downlink component carriers, and a Radio Resource Control (RRC) connection request signal.

2. The method according to claim 1, wherein respective indices of the plurality of the downlink component carriers are defined in increasing or decreasing order of corresponding frequencies.

3. A method for a user equipment to perform random access to a base station in a wireless communication system that supports multiple uplink and downlink component carriers, the method comprising:

receiving system information including index information of each of a plurality of the downlink component carriers and Physical Random Access Channel (PRACH) Time Frequency (TF) slot and preamble sequence information which is common to all of the plurality of the downlink component carriers, the system information being broadcast through each of the plurality of the downlink component carriers corresponding to the index information;

transmitting a PRACH preamble through one uplink component carrier linked to the plurality of the downlink component carriers using the received PRACH TF slot and preamble sequence information;

receiving a Random Access Channel (RACH) response through each of the plurality of the downlink component carriers; and transmitting, using the index information, index information of a downlink component carrier, which the user equipment desires to access among the plurality of the downlink component carriers, and a Radio Resource Control (RRC) connection request signal.

4. The method according to claim 3, wherein respective indices of the plurality of the downlink component carriers are defined in increasing or decreasing order of corresponding frequencies.

5. A method for a user equipment to perform random access to a base station in a wireless communication system that supports multiple uplink and downlink component carriers, the method comprising:

receiving system information including Physical Random Access Channel (PRACH) Time Frequency (TF) slot and preamble sequence information which is common to all of a plurality of the downlink component carriers, the system information being broadcast through each of the plurality of the downlink component carriers;

transmitting a PRACH preamble through one uplink component carrier linked to the plurality of the downlink component carriers using the received PRACH TF slot and preamble sequence information;

receiving a Random Access Channel (RACH) response and index information of each of the plurality of the downlink component carriers through each of the plurality of the downlink component carriers corresponding to the index information; and transmitting, using the index information, index information of a downlink component carrier, which the user equipment desires to access among the plurality of the downlink component carriers, and a Radio Resource Control (RRC) connection request signal.

6. The method according to claim 5, wherein respective indices of the plurality of the downlink component carriers are defined in increasing or decreasing order of corresponding frequencies.

7. A method for a user equipment to perform random access to a base station in a wireless communication system that supports multiple uplink and downlink component carriers, the method comprising:

receiving system information including Physical Random Access Channel (PRACH) Time Frequency (TF) slot and preamble sequence information which is common to all of a plurality of the downlink component carriers, the system information being broadcast through each of the plurality of the downlink component carriers;

transmitting a PRACH preamble through one uplink component carrier linked to the plurality of the downlink component carriers using the received PRACH TF slot and preamble sequence information;

receiving a Random Access Channel (RACH) response of each of the plurality of the downlink component carriers at predetermined time intervals through each of the plurality of the downlink component carriers, wherein each of the downlink component carriers is associated with an index information; and transmitting, by the user equipment, a Radio Resource Control (RRC) connection request signal when a predetermined time elapses after the user equipment receives the RACH response so that the base station identifies a downlink component carrier that the user equipment desires to access among the plurality of the downlink component carriers with reference to a time at which the RRC connection request signal is received.

8. The method according to claim 7, wherein the time at which the RRC connection request signal is transmitted is after the RACH response is received and before a next RACH response is received.

* * * * *